United States Patent [19]

Wells et al.

[11] Patent Number: 4,713,890
[45] Date of Patent: Dec. 22, 1987

[54] MISLEVEL SENSING DEVICE

[75] Inventors: Leon W. Wells, Closter; Werner Hauschild, Whippany, both of N.J.

[73] Assignee: Cubic Corporation, San Diego, Calif.

[21] Appl. No.: 2,419

[22] Filed: Jan. 12, 1987

[51] Int. Cl.⁴ .......................... G01C 9/06; G01C 9/12
[52] U.S. Cl. ......................................... 33/366; 33/391
[58] Field of Search ............... 33/366, 391; 73/517 R; 340/689

[56] References Cited

U.S. PATENT DOCUMENTS

| | | | |
|---|---|---|---|
| 2,744,335 | 5/1956 | Litman | 33/366 |
| 2,928,183 | 3/1960 | Adams | 33/366 |
| 3,026,429 | 3/1962 | Karpchuk | 73/517 R |
| 3,083,469 | 4/1963 | Herbst | 33/366 |
| 3,238,631 | 3/1966 | Graf | 33/366 |
| 3,286,357 | 11/1966 | Grumman | 33/366 |
| 4,077,132 | 3/1978 | Erickson | 33/366 |
| 4,561,299 | 12/1985 | Orlando et al. | 33/366 |

FOREIGN PATENT DOCUMENTS

| | | | |
|---|---|---|---|
| 544412 | 1/1956 | Belgium | 33/366 |
| 143711 | 7/1985 | Japan | 33/366 |

Primary Examiner—Richard R. Stearns
Attorney, Agent, or Firm—Lionel N. White

[57] ABSTRACT

An improved mislevel sensing device having a balanced pair of capacitive pick-up circuits includes a pendulously-suspended common electrode assembly comprising a leaf spring member in the available flexing length of which is located a centrally-disposed hole which effectively reduces the cross-sectional dimensions of the suspension leaf member in that area, consequently restricting the beam-like flexure of the leaf to that area and away from sharp stress-imparting edges of leaf-clamping members of the device. The device further includes means for readily adjusting its attitude with respect to a primary reference axis of the host instrument, and means for providing protection of the functional capacitive couples from variable stray capacitive fields arising within the instrument, and from the intrusion of capacitance-effecting ambient moisture.

13 Claims, 6 Drawing Figures

MISLEVEL SENSING DEVICE

BACKGROUND OF THE INVENTION

In many instruments used to perform geodetic measurements, particularly digital theodolites with integrated angle sensing and distance measuring systems, such as described in U.S. Pat. No. 4,205,385, there are employed gravity-related sensing devices which maintain a datum reference with respect to the attitude of the primary, vertical axis of the instrument.

One such a sensing device, described in U.S. Pat. No. 4,077,132, utilizes a capacitive pick-up system which includes a pendulously-suspended weight member which serves as an electrode common to a blanced pair of capacitors. In order to provide a high level of sensitivity in the device therein described, the suspension system comprises a number of relatively narrow flexible straps which support this mobile electrode. However, while these strap members provide a ready response to minute displacement of the reference axis, due to their flexibility they unfortunately render the sensing device susceptible to damage as a result of the rough handling which is often encountered during the course of a surveying project.

A device which is sensitive enough to register slight deviations from a base reference attitude, yet is able to withstand reasonably severe physical shocks or jarring, has thus long been needed in the field of geodetics and other real-world environments. The present invention provides such a versatile mislevel sensing device.

SUMMARY OF THE INVENTION

In a device according to the present invention, the weight comprising the common electrode of the capacitive pick-up system is pendulously suspended on a metallic leaf spring member which has significant width as compared to its minute thickness. In this manner the pendulum electrode is substantially limited in its movement to the one degree of freedom along the axis lying perpendicular to its parallel faces, thus preventing damage which could result from undampened lateral movement within its housing.

Further, the present invention provides a means for simple and rapid assembly of the sensing device, yet allows for the maintaining of precise pendulous movement of the common electrode without the imparting of error-inducing strains upon the suspension system over long periods of operation or storage. This effect is accomplished by removing a portion of the central area of the suspension leaf member at a point along its length which is displaced from the point at which this member is affixed to the body of the device. In this manner the flexure characteristics of the suspension leaf member are made to primarily resemble those of a beam having the lesser cross-sectional dimensions of the segment from which the central portion was removed, thereby moving the region of pendulous flexure of the leaf away from the immobilized end at which it is affixed to device body and reducing significantly the strain upon the leaf at that point.

The device of this invention additionally provides means for readily adjusting its reference attitude to the primary axes of the instrument with which it is being employed, and it also includes means for insulating the functional capacitive coupling from the otherwise disruptive effect of stray capacitive fields caused by the movement of various internal members of the host instrument.

THE DRAWINGS

The present invention may be more clearly observed and understood by reference to the accompanying drawings, of which:

DESCRIPTION

Figure 1:
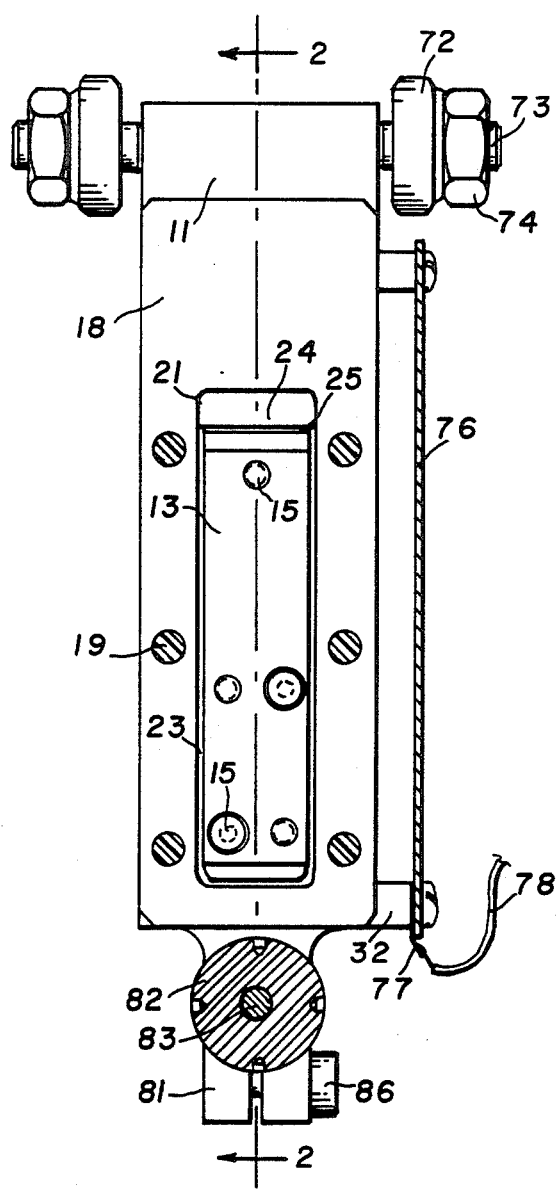
FIG. 1 is the front elevation view of an embodiment of the invention taken in section along 1—1 of FIG. 2.

The manner of operation and utilization of a mislevel sensing device embodying the present invention are substantially the same as those described in the above-referenced U.S. Pat. No. 4,077,132. In this respect the device basically comprises a body member 11 from which is pendulously suspended a weight member 13 by means of leaf strap member 14. Affixed to, yet electrically insulated from, body member 11 are plate members 22, 22' which are positioned adjacent and parallel to the respective parallel faces of weight 13. The inward faces of plates 22, 22' and those of weight 13 are electrically conductive, thereby forming a pair of capacitors of which the faces of weight 13 acts as a common ground electrode.

Each of these capacitors comprises a member of two comparative timing circuits which provide digital counts, over a given time period, indicative of the separation between the respective capacitor electrodes, the difference between such counts providing a measure of the displacement of the weight member electrode due to a deviation of the associated host instrument from a level datum reference.

While retaining the basic structure and function of the patented device, the mislevel sensor of the present invention represents a significant improvement, particularly in the areas of the simplicity of its manufacture and its rugged compactness and resistance to jolts and jarring commonly encountered in the field. An embodiment of the invention also provides increased protection from stray electrical capacitances which have heretofore interfered with the accurate operation of this type device.

Figure 2:
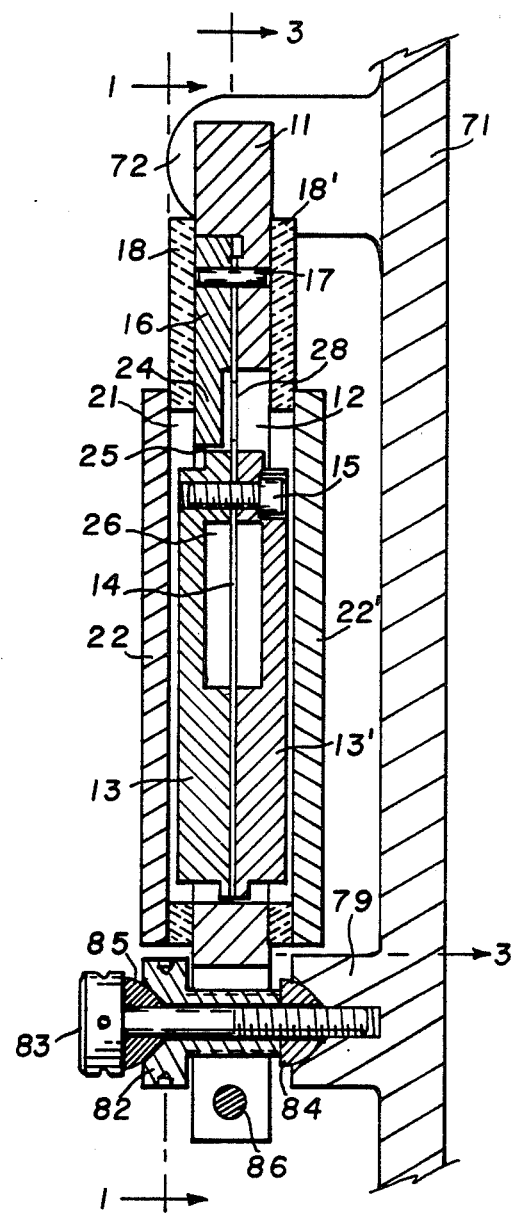
FIG. 2 is a side elevation view of the embodiment taken in section along 2—2 of FIG. 1.
Figure 3:
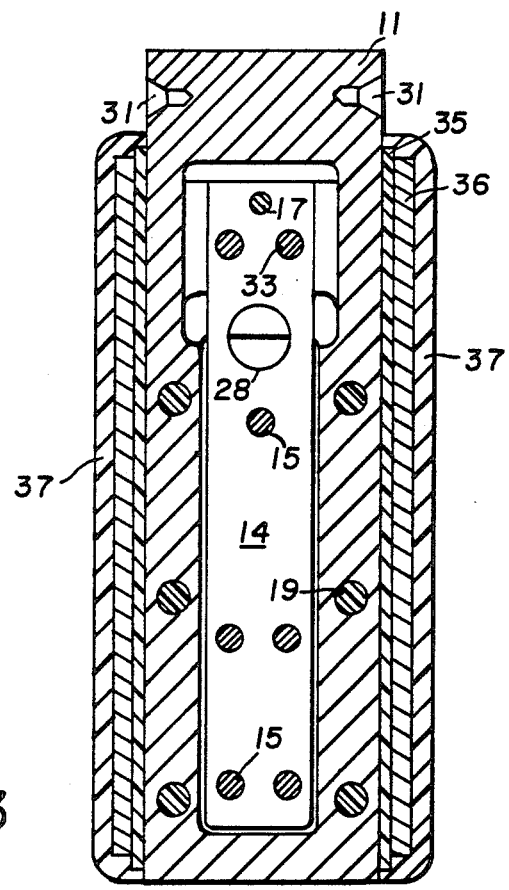
FIG. 3 is an elevation view of another embodiment of the invention taken in section along 3—3 of FIG. 2.

The structure of this improved device may be readily observed by reference to FIGS. 1, 2, and 3 of the drawings. As more briefly described above, the device comprises body member 11 of metal, such as brass or aluminum, and of which a central portion has been removed to provide a frame-like structure about an open window area 12. A pendulum assembly comprising a metal leaf spring member 14 and affixed weight elements 13, 13' is suspended within window 12 by means of clamp block 16 which is affixed to body 11 with screws 33. A locating pin 17 aids in the proper alignment of body 11, leaf 14, and clamp block 16 during this assembly procedure.

As depicted, the weight member of the pendulum assembly comprises a pair of elements 13, 13', typically of brass, which are arranged at opposite faces of suspension leaf 14 and are firmly clamped upon leaf 14 by means of bolts 15. A portion of the bodies of elements 13, 13' may be removed, as at 26, to lighten the weight and to adjust the position of the center of gravity as desired. In this embodiment of the device, each of body 11, leaf 14, and weight elements 13, 13' are constructed of metal, and thereby comprise a single electrically conductive assembly which serves as the ground electrode of the capacitor pair, as will later be seen. It is necessary, however, only that the outer faces of pendulum weight electrode 13 (for simplicity the weight assembly may be referred to as a unit 13) be electrically conductive; therefore, weight member 13 may be made of non-metallic material if electrical continuity is maintained between its conductive face electrodes. In order to avoid imparting stresses upon the pendulum balance by the attachment of separate conductors, though, it is much preferred to construct the body/pendulum assembly as a single electrically conductive unit.

Further in the construction of the present device, insulating plates 18, 18' of ceramic or other non-conductive material are positioned at opposite faces of body 11. Open areas 21 centrally located in these frame-like plates extend cavity 12 of body 11 to substantially encompass the operational range of movement of weight 13. Conductive plates 22, 22', again of brass, aluminum, or other metal, or plates of a non-conductive material with a layer of conductive substance on the inner face, overlay the openings of plates 18, 18', and are affixed to the assemblage by means of bolts 19, of non-conducting material such as nylon when metal plates are used, to provide the remaining capacitor electrodes and to seal the pendulum cavity.

The respective dimensions of weight 13, and of the openings 12, 21 in body 11 and plates 18, 18' are selected to be such as will allow about 0.05 mm. clearance 23 about the periphery of weight 13 between its edges and bottom end and the walls of the encompassing body cavity. A lip portion 24 of clamp block 16 extends to about the same distance from the upper edge of weight 13 to provide clearance space 25 which completes the air-dampening system for movement of weight 13.

The sensing device thus constructed is mounted to the instrument, for example a geodetic theodolite, whose attitude is to be monitored in such a manner as to readily enable aligning adjustment of the device with respect to the vertical datum axis of the instrument. To this end, the upper end of body 11 is suspended between a pair of arms 72 extending from a vertical wall 71 of the instrument by means of adjustable axle segments 73 which are threaded through arms 72. The conical ends of axles 73 are screwed into firm, pivotal engagement with matching bores 31 in body 11 and are locked in place by nuts 74.

The lower end 81 of body 11 includes a threaded bore which is aligned perpendicular to the axis of suspending axles 73 and in which is received capstan bolt 82. Body end I5 portion 81 is further split along the length of the bore receiving bolt 82, and has an additional, transverse bore in which is threaded locking bolt 86. By means of this latter bolt, the arm segments of body end portion 81 may be firmly clamped upon bolt 82 when a final desired adjusted position of the mislevel device is attained, as will now be described.

A stud 79 extending from instrument wall 71 below and intermediate suspension arms 72 has a threaded bore in which is received anchor bolt 83 which extends through a smooth longitudinal bore in bolt 82. Positioned upon bolt 83 respectively intermediate its head and that of bolt 82, and the foot end of bolt 82 and stud 79 are hemispheric bushings 85, 84. Received in conical bores in the head of bolt 82 and the end of stud 79, these bushings accommodate any slight misalignment of bolts 82, 83 which may occur during the adjustment of the attitude of the sensing device, thereby preventing stresses which might later translate to an improper alignment of the elements of the device.

In the initial stage of the adjustment of the mislevel sensor with respect to the instrument, bolt 83 is screwed into stud 79 until bushings 84, 85 firmly engage their respective conical seats, yet allow rotational movement of bolt 82 between them. With bolt 86 effecting locking engagement of body end portion 81 upon bolt 82, axle segments 73 are screwed in similar directions to rotate the sensing device about bolt 83 laterally with respect to the direction of swing of pendulum weight 13. When the attitude of the device in this plane is substantially parallel to the vertical working axis of the instrument, nuts 74 are tightened to prevent further such movement of the device.

To complete the adjustment, bolt 86 is loosened sufficiently to allow rotation of bolt 82 and permit thread-advanced displacement of body end 81 along bolt 82. The sensing device is thus rotated about the axis of axles 73 in the pendulum movement longitudinal direction. In this final, and most critical, stage in the adjustment of the device with respect to its host instrument, the instrument is leveled in a reference stand and its vertical axis made precisely vertical, and the measuring circuitry of the device is made operational. Bolt 82 is then rotated to move the body of the sensing device with respect to the now stationary pendulum weight 13 sufficiently to situate capacitor electrode plates 22, 22' equidistant from the facing surfaces of weight elements 13, 13', this position being indicated by the registration of a zero degree of mislevel by the readout associated with the circuitry of the device. Bolt 86 is then again tightened to clamp body end portion 81 upon bolt 82 to prevent further movement of the device.

In the preferred embodiment of the present mislevel sensing device, body 11, suspension leaf 14, and pendulum weight 13 are made of metal and are suspended between metal axle segments 73, thereby establishing the electrical potential of the common pendulum electrode of the capacitor pair at the ground level of the host instrument. An electrical conductor 78 affixed to terminal 77 which is attached to stud 32 on body 11 provides the primary ground lead to the measuring circuitry. Separate conductors, not shown, provide the leads from capacitor plates 22, 22' to the remainder of the measuring circuitry as described in U.S. Pat. No. 4,077,132.

Figure 4:
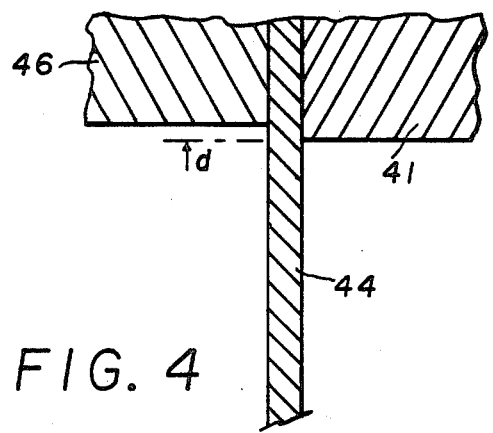
FIG. 4 is a representational view, in section, of a problem encountered in the assembly of prior art devices.

A problem heretofore often encountered in the assembly of single leaf pendulum devices is graphically displayed in FIG. 4 in which segments 46, 41, representative of clamp block 16 and body 11 of FIG. 2, engage a segment 44 of a leaf spring member, such as suspension leaf 14 of FIG. 2. Unless time-consuming and expensive procedures and equipment are employed during construction of a pendulum device such as is utilized in the present invention, the lower edges of elements 46, 41 which establish the points of suspension for leaf member 44 are seldom positioned precisely equidistant from the center of gravity of the pendulum weight. As a result, the pendulum moment arm varies by a difference, d, in length depending upon the direction in which the pendulum weight is displaced from the vertical datum plane.

Figure 5:
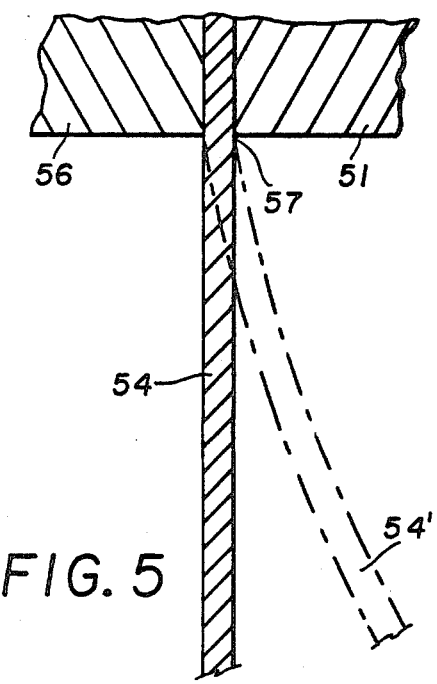
FIG. 5 is a representational view, in section, of the flexing function of a prior pendulum-suspending member.

Even when the simpler and more economical assembly practice of the present invention utilizing the combination of alignment pin 17 and clamping block 16 are employed, and the bottom edge suspension points of the clamping members are precisely aligned, a further problem often persists which adversely effects the accuracy of the mislevel sensing device. The graphic representation of FIG. 5 depicts such a condition wherein clamping members 56,51, again similar to block 16 and body 11, are in precise alignment in their suspending engagement of leaf 54. Further depicted at 54', greatly exaggerated for pictorial clarity, is the beam-like flexure experienced by leaf 54 upon displacement of the pendulum weight by tilting of the sensing device with its host instrument.

While a true beam deflection of the suspension leaf member is optimally desired for consistent accuracy in the device, the stress of the sharp bending of the leaf/beam at abrupt clamping edge 57 imparts a flexure set in that portion of the leaf material, particularly if the weight displacement is maintained for any significant length of time. In such manner suspension leaf 54 acquires a "memory" in the region of its sharp flexure which later resists return of the pendulum weight to its zero vertical datum position, or detracts from its displacement in the opposite direction. In either circumstance, the registered extent of pendulum electrode displacement, thus the degree of mislevel of the host instrument, is rendered in error over the term of the persistence of the stress-imparted memory of leaf 54.

By means of an aspect of the present invention, the exposure of a suspension leaf member to the deleterious effects of sharp bending at the edges of clamping members is substantially eliminated by means of a reduction in the effective dimensions of a portion of the beam of which the leaf member essentially consists. In so reducing the dimensions of the leaf/beam in a location which is a distance from the clamping members, the beam flexure of the leaf is shifted away from those members and occurs, with displacement of the pendulum weight, in relative isolation from any sharp breaking edges of contacting elements.

Figure 6:
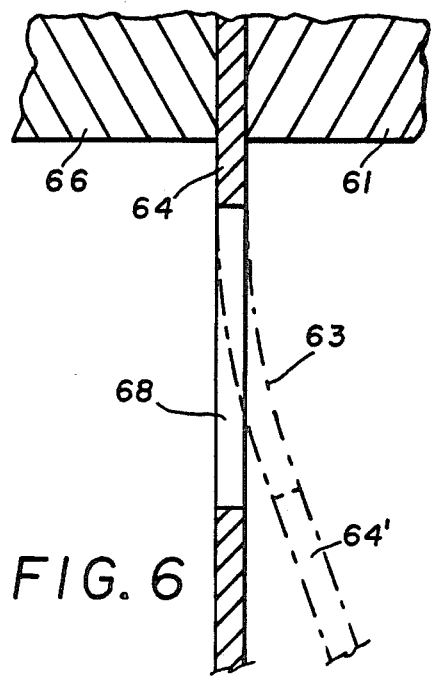
FIG. 6 is a representational view, in section, of the flexing function of a pendulum-suspending member of the present invention.

In a preferred embodiment of the device of this invention, a circular hole 28 is cleanly stamped in the center of suspension leaf member 14 at a position which will be displaced from the lower edges of clamp block 16 and body 11 at assembly of the device. The effect of the introduction of this dimension-reducing hole is depicted at FIG. 6 wherein clamping member segments 66, 61 engage leaf member 64 from which a portion has been removed to yield a centrally-disposed, circular relief 68. Displacement of the pendulum weight effects the represented flexure of leaf/beam 64' over a portion of its length which is delimited by the dimensions of relieved area 68. Substantially no flexure of leaf 64 occurs beyond this relieved area, and thus there is little occasion for the imparting of the undesired flex stress memory in the region of the clamping member edges.

Use of the circular punched relief 28 in the preferred embodiment provides a means for retaining a greater proportion of the lateral, displacement-resistant strength of suspension leaf 14, and for substantially eliminating weakening sharp corner points which would result from an otherwise effective rectangular or other polygonal relief hole. Although the circular relief yields a nonlinear beam flexure function over the effective length of the region of relief 28, the resulting differences are insignificant in the virtual hinge-like flexure of leaf/beam 14, and are well compensated by the relative ease of controlling the circle-punching operation, and other construction advantages.

In this embodiment, suspension leaf 14 is selected of a commercial grade of beryllium-copper with cross-sectional dimensions of about 9.5×0.05 mm. Relief hole 28 is centered in the width of leaf 14 and has a diameter of about 4.75 mm. The selection of Be-Cu as the leaf material was based primarily upon the optimal balance of the properties of this alloy with respect to strength, thermoelastic coefficient, workability, and economy. For applications where the highest precision is required, and where economy is of little concern, constant modulus alloys of iron-nickel with chromium and titanium, such as are commercially available under trademarks of Ni-Span C, Durinval, Nivarox, Elinvar, and others, may be employed.

Also included in the preferred embodiment of a sensing device of the present invention are means for significantly reducing the effect upon the capacitive pickup couples of extraneous and varying capacitive fields which are unavoidably set up within the host instrument. Such fields are particularly prevalent in geodetic theodolite instruments which have moving metal elements, such as angle-shifting and telescope-focussing mechanisms, closely adjacent the sensing device. One such means for protecting the pick-up is the positioning of intervening ground plates of a metal, such as brass, between the region of the pendulum/plate capacitor members and the major nearby moving metal components of the instrument. In the embodiment shown in FIG. 1, such a plate 76 is affixed to studs 32 extending from body 11, thereby providing a directly grounded shield for the capacitive couples of weight 13 with plates 22, 22'. Circuit ground conductor 78 further ensures the maintenance of the protective ground plane.

Another, and preferred, embodiment of this capacitive couple protection is shown in FIG. 3 and comprises a complete encasement of the capacitor pair region of the sensing device in a separate ground shield. As there depicted, the device is enwrapped over a length encompassing the whole of the pendulum/plate assembly with an insulating layer of a high dielectric material, such as polyethylene terephthalate film 35. This film is then itself overwrapped with a foil 36 of about 0.5 mm. brass which is well grounded with respect to the capacitor circuit by means of an electrical conductor, not shown. This assembly is finally encased in a layer 37 of a commercially available waterproof potting compound of silicone rubber or the like. In this manner the entire mislevel sensor pick-up assembly is protected not only from variant capacitive fields, but also from ambient moisture which could cause otherwise uncontrolled variations in the capacitance of the pick-up couples.

Other embodiments similar to those above-described will be apparent to the skilled artisan from consideration of the foregoing specification, and such are nonetheless deemed to be within the scope of the invention recited in the appended claims.

What is claimed is:

1. A mislevel sensing device comprising:

a. an elongate body member having a centrally-disposed opening therein;
b. means supporting said body member in a substantially vertical longitudinal attitude and providing for selective rotational movement of said body about orthogonally-disposed axes situated in the respective end regions of said body member;
c. a pendulum assembly mounted for gravity-influenced movement within said body member opening, said assembly comprising,
   (1) a weight member having a pair of substantially parallel, planar, electrically-conductive faces in common circuit, and
   (2) an elongate leaf spring member firmly affixed to and extending between said body and weight members, thereby suspending said Weight member for said gravity-influenced movement,
   (3) said leaf spring member having a significantly greater width than thickness, and having an opening substantially centrally-disposed in said width intermediate said body and weight members, thereby significantly reducing the area of leaf material in the region of said opening;
d. a pair of plate members affixed to said body member at opposite sides of said weight member, thereby overlaying said body member opening and forming a sealed cavity within which said weight member is contained, the inwardly-disposed planar faces of said plates being electrically-conductive and situated closely adjacent and substantially parallel to the respective faces of said weight member; and
e. electrical conductors in circuit with each separate one of said conductive plate member faces and said common weight face circuit, thereby providing a pair of capacitor circuits wherein each comprises one of said plate faces and said electrically common weight faces.

2. A device according to claim 1 wherein said body member comprises:
a. an electrically-conductive body element having an open frame-like structure in the central region of its length; and
b. a pair of electrically non-conductive elements of similarly dimensioned frame-like structure respectively overlaying the opposite faces of said body element, thereby insulating said body element from the electrically-conductive faces of said plates members.

3. A device according to claim 1 wherein said leaf spring member is affixed to said body member by planar clamp plate means arranged for compressive movement toward a planar, centrally-disposed surface of said body member to thereby fixedly engage the upper end portion of said leaf member between said clamp plate and body member surface.

4. A device according to claim 3 wherein said clamp plate, body member surface, and leaf member end portion have aligned bores therethrough in which a pin element is received, thereby aligning said plate and members prior to said compressive engagement of said leaf member.

5. A device according to claim 3 wherein said weight member comprises a pair of complementary elements of like dimension arranged for compressive movement toward a common longitudinal plane to thereby fixedly engage the lower end portion of said leaf member between said weight elements.

6. A device according to claim 5 wherein said weight member and body member opening are so dimensioned as to closely dispose their respective outer and inner longitudinal and lower lateral edges, and wherein a lower end portion of said clamp plate presents a lower lateral edge in like close disposition with the upper lateral edge of said weight member, thereby establishing a close-tolerance cylinder within which movement of said weight member occurs and which provides air dampening of such movement.

7. A device according to claim 1 wherein said leaf opening consists of a circular hole therein having a diameter of about one-half the width of said leaf.

8. A device according to claim 2 wherein said body, leaf spring, and weight members are of metal, thereby comprising thereof a common electrical circuit.

9. A device according to claim 1 wherein said supporting means comprises:
a. means mounting the upper end of said body member between extendable axles on an axis transverse to the direction of said pendulum movement, and
b. means mounting the lower end of said body member upon a threaded axle on an axis transverse to said upper end axis and extending in the direction of said pendulum movement.

10. A device according to claim 1 which further comprises capacitive field shielding means comprising a metal sheet arranged adjacent said body member and of an area sufficient to at least encompass the range of operative movement of said pendulum weight member faces, said sheet being in electrical circuit and at like potential with said faces.

11. A device according to claim 10 wherein said shielding means comprises an electrically-nonconductive insulating film enwrapping said body and plates members, and wherein said metal sheet comprises a foil enwrapping said film and maintained thereby from contact with said body and plate members.

12. A device according to claim 11 which further comprises a layer of water-resistant, electrically-insulating substance encompassing said metal sheet and film, thereby further sealing said body member cavity from ambient moisture.

13. In a pendulum assembly comprising an elongate leaf spring member having a significantly greater width than thickness and being fixedly clamped at its respective ends between planar face pairs of a body member and a weight member, thereby suspending said weight member for gravity-influenced movement with respect to said body member with resulting flexure of said leaf member, the improvement comprising an opening through said leaf member substantially centrally-disposed in the width thereof intermediate and spaced from said body and weight members and having a width significantly reducing the cross-sectional area of said leaf member in the region of said opening, thereby concentrating the flexure of said leaf in said region and away from the edges of said body member face pair.

* * * * *